(12) United States Patent
Matsui

(10) Patent No.: US 9,402,049 B2
(45) Date of Patent: Jul. 26, 2016

(54) IMAGE PROCESSING APPARATUS AND CONTROL METHOD THEREOF

(71) Applicant: CANON KABUSHIKI KAISHA, Tokyo (JP)

(72) Inventor: Shun Matsui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 14/537,562

(22) Filed: Nov. 10, 2014

(65) Prior Publication Data
US 2015/0131004 A1 May 14, 2015

(30) Foreign Application Priority Data
Nov. 14, 2013 (JP) ................................. 2013-236261

(51) Int. Cl.
*H04N 5/77* (2006.01)
*H04N 5/765* (2006.01)

(52) U.S. Cl.
CPC ................ *H04N 5/772* (2013.01); *H04N 5/765* (2013.01)

(58) Field of Classification Search
None
See application file for complete search history.

(56) References Cited

FOREIGN PATENT DOCUMENTS

| JP | 3513506 B | 3/2004 |
|----|-----------|--------|
| JP | 2008-199177 A | 8/2008 |
| JP | 4626007 B | 2/2011 |
| JP | 2011-097541 A | 5/2011 |

*Primary Examiner* — Roberto Velez
*Assistant Examiner* — Stephen Coleman
(74) *Attorney, Agent, or Firm* — Cowan, Liebowitz & Latman, P.C.

(57) ABSTRACT

A first signal of a pixel of interest in second image data is generated by adding a plurality of signals that correspond to the same color component in first image data consisting of signals corresponding to a plurality of color components. A second signal of the pixel of interest in the second image data is generated by adding a plurality of signals in the first image data that correspond to different color components. The first signal and the second signal are mixed based on color information of the pixel of interest. Jaggies are effectively ameliorated by replacing the value of the pixel of interest with the mixing result.

15 Claims, 10 Drawing Sheets

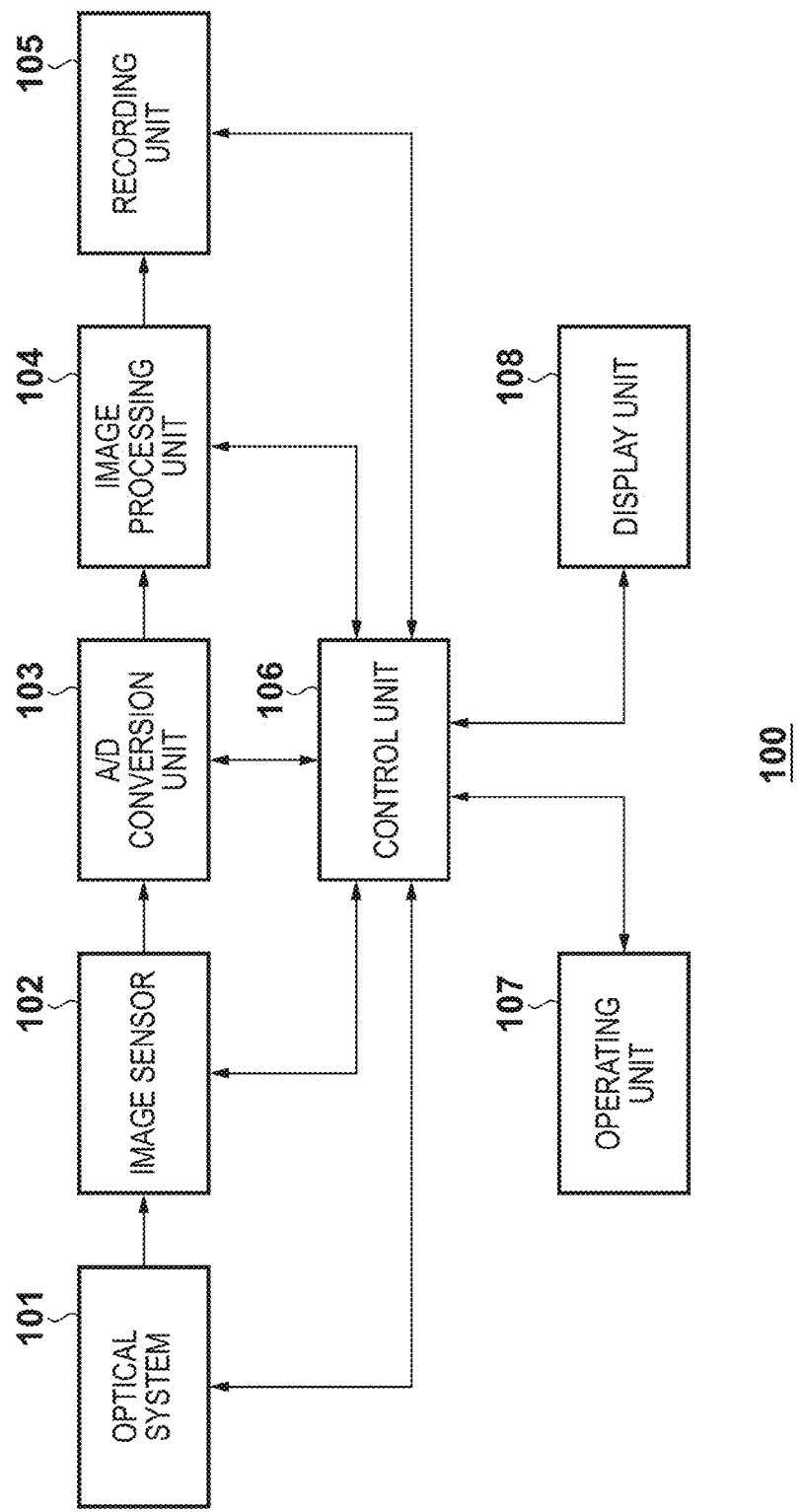

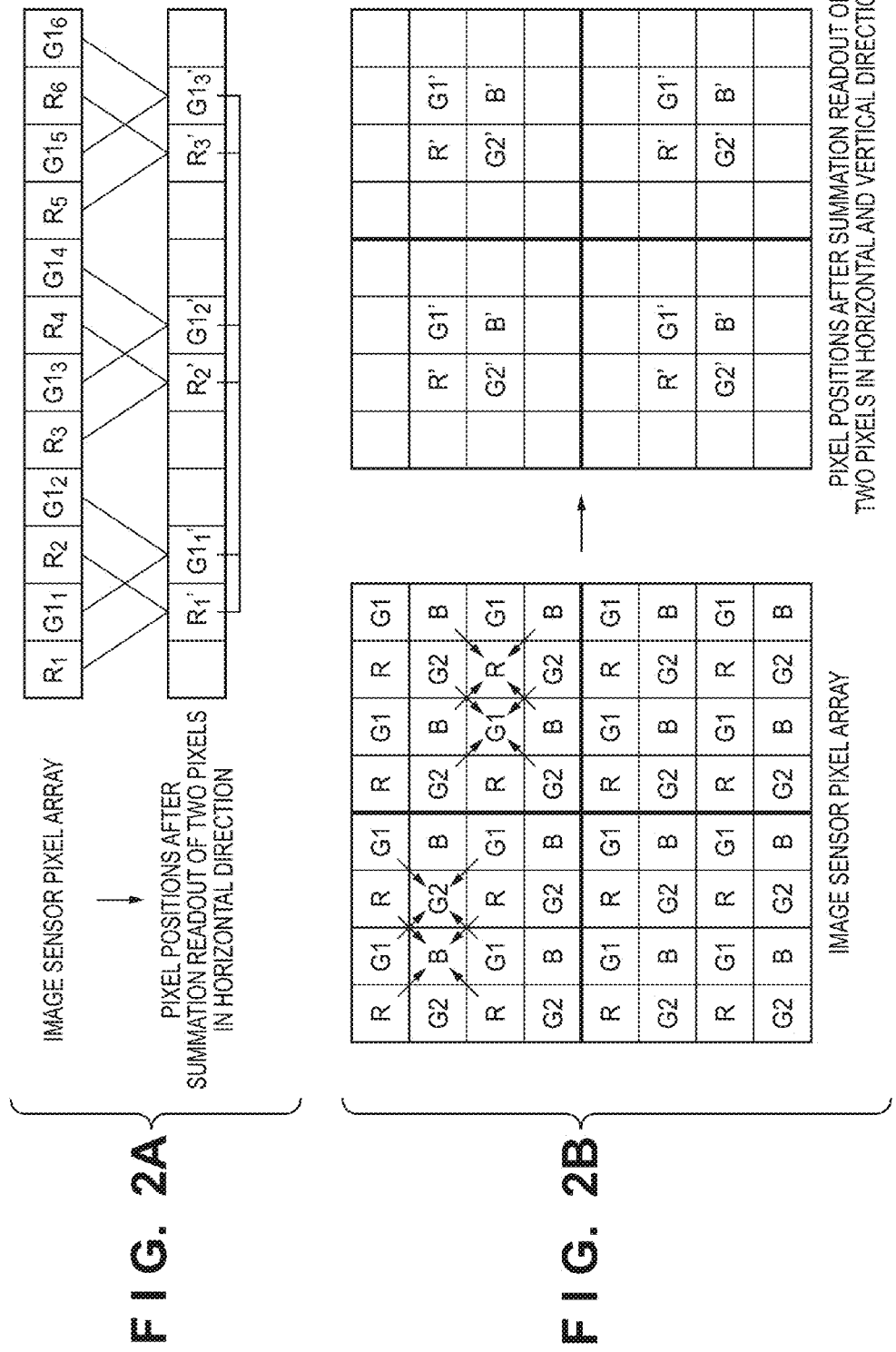

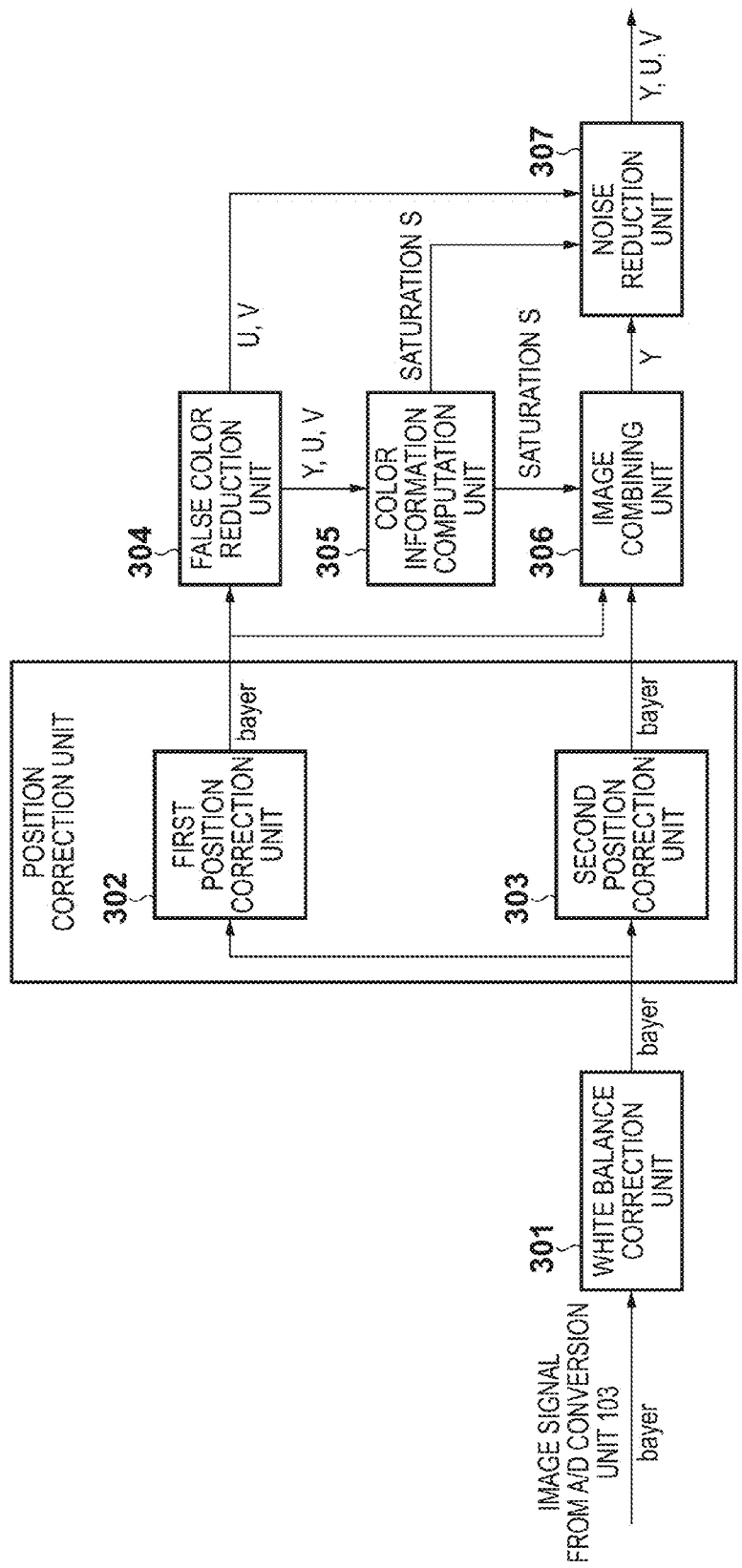

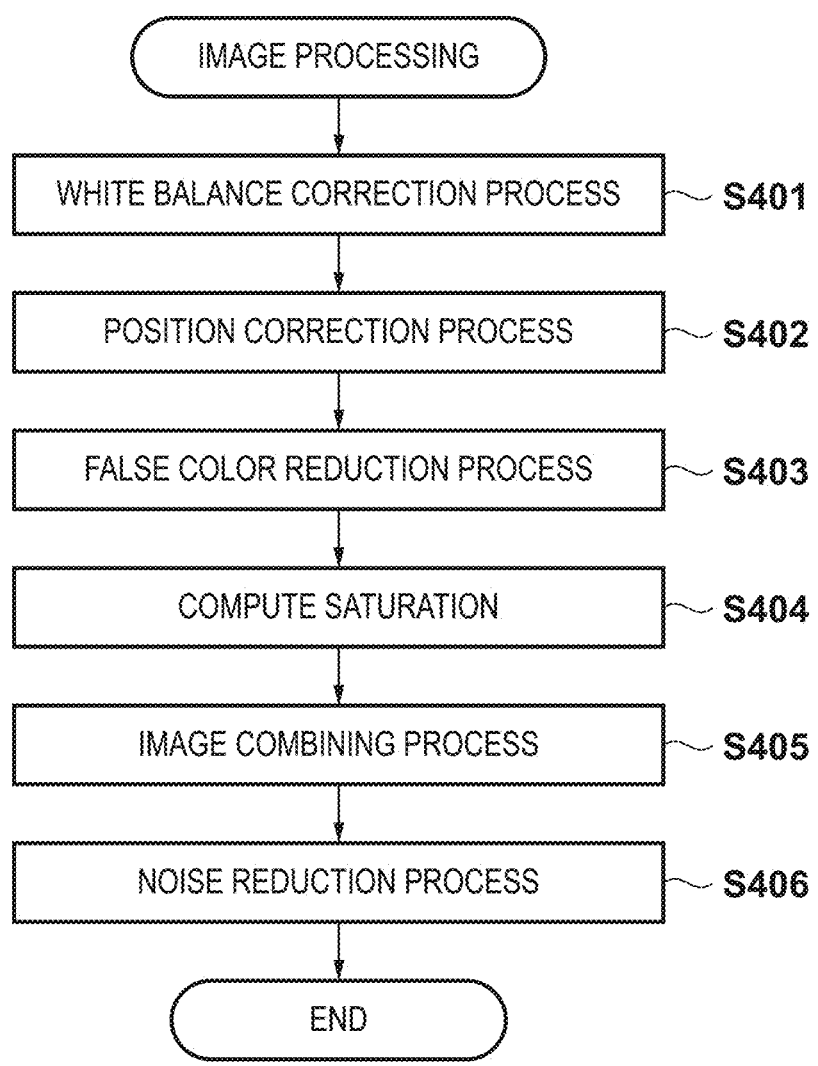

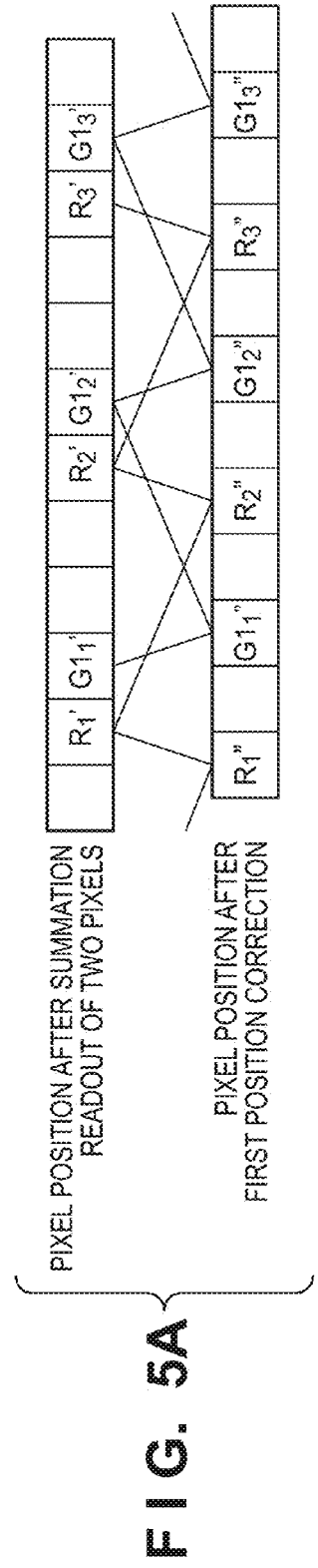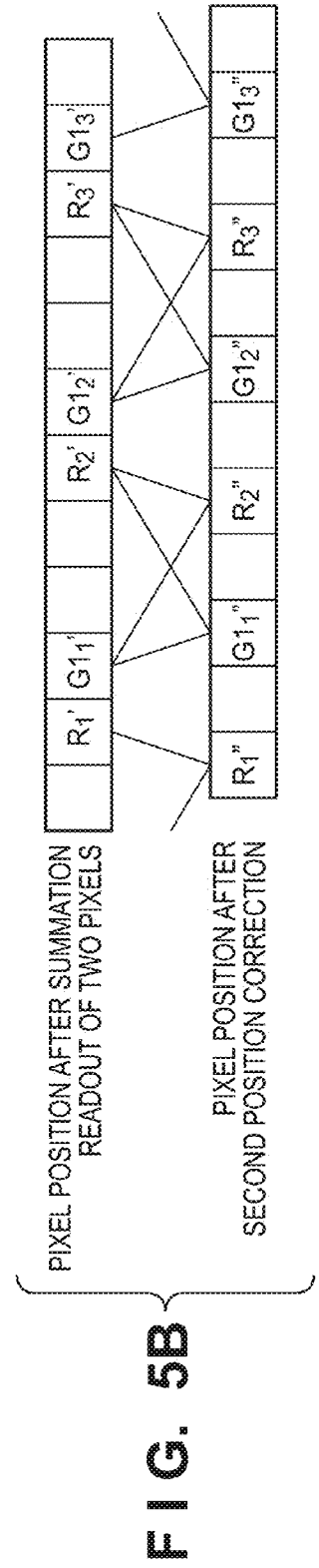

CZP

IMAGE AFTER POSITION
CORRECTION BY FIRST POSITION
CORRECTION UNIT 302

IMAGE AFTER POSITION
CORRECTION BY SECOND POSITION
CORRECTION UNIT 303

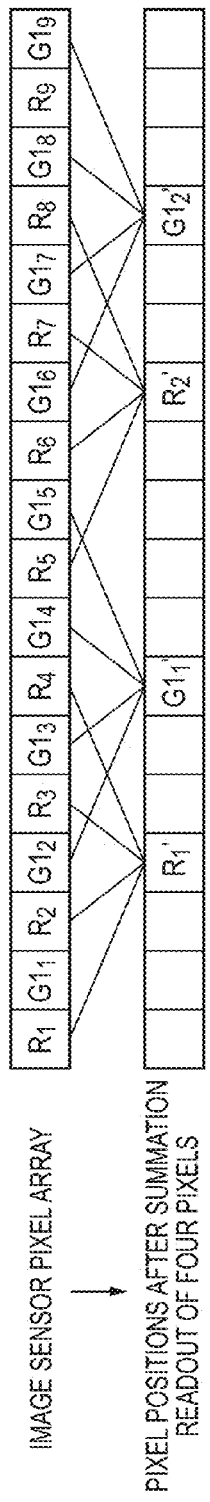
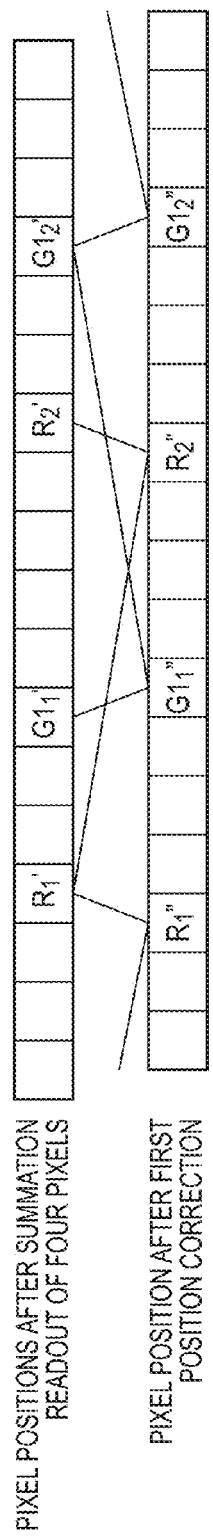
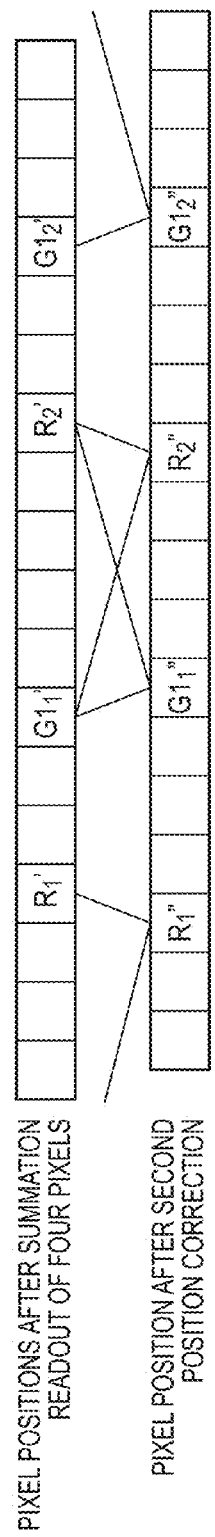

IMAGE PROCESSING APPARATUS AND CONTROL METHOD THEREOF

BACKGROUND OF THE INVENTION

1. Field of the Invention

The present invention relates to image processing apparatuses and control methods thereof.

2. Description of the Related Art

Depending on the application of a captured image, shooting conditions, or the like, image signals are sometimes read out from only some pixels of an image sensor, rather than from all pixels of the image sensor. In such a case, the signals from a plurality of pixels having the same color are added together and read out, the pixels are thinned and read out, or the like.

However, the logical spatial positions of image signals resulting from summation readout, thinning readout, or the like (that is, virtual pixel positions obtained from the positions of summed pixels) are not at equal intervals. Such positional skew is called "center deviation", and center deviation is a cause of jaggies (step-like artifacts found at the edges of sloped lines and so on), which reduce the image quality.

In response to such a problem, Japanese Patent Laid-Open No. 2008-199177 and Japanese Patent Laid-Open No. 2011-97541 disclose techniques for obtaining a weighted sum of same-color pixels resulting from summation readout and correcting the center positions of the summed pixels.

However, positional correction through obtaining a weighted sum using only same-colored pixels, as disclosed in Japanese Patent Laid-Open No. 2008-199177 and Japanese Patent Laid-Open No. 2011-97541, cannot be said to have sufficient effects with respect to ameliorating jaggies through the correction, and there is still room for improvement.

The present invention provides an image processing apparatus and control method thereof capable of more effectively ameliorating jaggies.

SUMMARY OF THE INVENTION

According to one aspect of the present invention, there is provided an image processing apparatus that generates second image data from first image data, the first image data consisting of signals corresponding to a plurality of color components, the apparatus comprising: a first correction unit that generates a first signal of a pixel of interest in the second image data by adding a plurality of signals in the first image data that correspond to the same color component; a second correction unit that generates a second signal of the pixel of interest in the second image data by adding a plurality of signals in the first image data that correspond to different color components; and a mixing unit that mixes the first signal generated by the first correction unit and the second signal generated by the second correction unit based on color information of the pixel of interest.

According to another aspect of the present invention, there is provided a control method for an image processing apparatus that generates second image data from first image data, the first data consisting of signals corresponding to a plurality of color components, the method comprising: a first correction step of generating a first signal of a pixel of interest in the second image data by adding a plurality of signals in the first image data that correspond to the same color component; a second correction step of generating a second signal of the pixel of interest in the second image data by adding a plurality of signals in the first image data that correspond to different color components; a mixing step of mixing the first signal generated in the first correction step and the second signal generated in the second correction step based on color information of the pixel of interest.

Further features of the present invention will become apparent from the following description of exemplary embodiments (with reference to the attached drawings).

BRIEF DESCRIPTION OF THE DRAWINGS

FIG. 1 is a block diagram illustrating the configuration of a digital camera serving as an example of an image processing apparatus according to an embodiment of the present invention.

FIGS. 2A and 2B are diagrams illustrating center deviation produced by summation readout of pixels.

FIG. 3 is a block diagram illustrating an example of the functional configuration of an image processing unit shown in FIG. 1.

FIG. 4 is a flowchart illustrating operations performed by the image processing unit shown in FIG. 1.

FIGS. 5A and 5B are diagrams illustrating a pixel position correction process according to an embodiment.

FIGS. 12A to 12C are diagrams illustrating examples of changes in pixel positions during summation readout of four pixels of the same color and post-correction pixel positions.

DESCRIPTION OF THE EMBODIMENTS

Figure 6A:
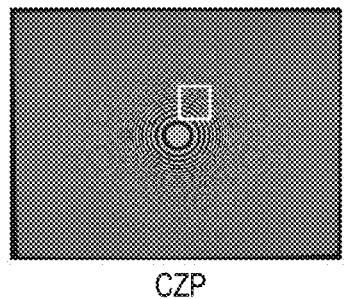
FIGS. 6A to 6C are diagrams illustrating a difference in the effects of correction performed by a first position correction unit and a second position correction unit on an achromatic color subject.

Exemplary embodiments of the present invention will now be described in detail in accordance with the accompanying drawings. Although the following describes an embodiment in which the present invention is applied in a digital camera serving as an example of an image processing apparatus, it should be noted that the present invention can be applied in any apparatus capable of processing image signals read out from color image sensors. Accordingly, electronic devices that include or can be connected to cameras, electronic devices capable of running image processing software, and so on, such as personal computers, tablet devices, video game devices, mobile telephones, and the like, also fall within the scope of such an image processing apparatus.

FIG. 1 is a block diagram illustrating the configuration of a digital camera serving as an example of the image processing apparatus according to an embodiment of the present invention.

A digital camera 100 includes an optical system 101, an image sensor 102, an A/D conversion unit 103, an image processing unit 104, a recording unit 105, a control unit 106, an operating unit 107, and a display unit 108. The optical system 101 includes a focus lens, an aperture, a shutter, and so on. During shooting, the optical system 101 carries out focus adjustment by driving the focus lens under the control of the control unit 106 and opens/closes the aperture, the shutter, and so on.

The image sensor 102 is a CCD image sensor, a CMOS image sensor, or the like that photoelectrically converts a subject image formed by the optical system 101 into electrical signals in units of pixels. R (red), G1 (green), G2 (green), and B (blue) pixels are arranged in the image sensor 102 in a primary color Bayer array. The image sensor 102 is furthermore capable of summation readout, thinning readout, and so on. The control unit 106 controls the readout of the electrical signals from the image sensor 102.

The A/D conversion unit 103 digitizes the electrical signals input from the image sensor 102. The digitized signals undergo white balance correction processing, false color reduction processing, pixel position correction processing, noise reduction processing, and so on in the image processing unit 104, and are ultimately converted into an image or moving picture format such as JPEG, MOV, or the like and recorded by the recording unit 105. The recording unit 105 records image files into a recording medium such as a semiconductor memory card, an internal memory, or the like.

The control unit 106 includes a programmable processor, a non-volatile memory, a volatile memory, and so on, for example, and controls the operations of the various units in the digital camera 100 by reading out programs stored in the non-volatile memory into the volatile memory and executing those programs. Note that the A/D conversion unit 103 and the image processing unit 104 may be partially or entirely realized as individual pieces of hardware, or may be realized as software through the programmable processor provided in the control unit 106.

The operating unit 107 is a group of input devices, such as switches, buttons, a touch panel, and so on through which a user inputs instructions, data, and so on into the digital camera 100. Note that the operating unit 107 collectively indicates the input devices, and the input devices may be provided in various locations of the digital camera. For example, the touch panel may be provided on the display unit 108. Furthermore, circuits and the like for realizing input methods that do not require physical input mechanisms, such as voice recognition and line-of-sight detection, are included in the operating unit 107.

The display unit 108 is a liquid crystal display or the like provided in a rear surface of the digital camera 100, for example, and is used to display screens for assisting operations during shooting, images saved in the recording unit 105, various types of menu screens, and so on.

Next, center deviation will be described using FIG. 2A. FIG. 2A illustrates a pixel array in a given horizontal line of the image sensor and the positions of pixels obtained through summation readout of two corresponding pixels in the horizontal line. Although a horizontal line containing R pixels and G1 pixels in a primary color Bayer array is illustrated here, the same applies to a horizontal line containing G2 pixels and B pixels.

It is assumed here that summation readout has been carried out according to the following Formulas (1) and (2), for example. i indicates a pixel number, and is an integer of 1 or greater. Meanwhile, $R_i'$ indicates the value of a post-summation R pixel, and $G1_i'$ indicates the value of a post-summation G1 pixel.

$$R_i' = (R_{(2i-1)} + R_{2i})/2 \quad \text{Formula (1)}$$

$$G1_i' = (G1_{(2i-1)} + G1_{2i})/2 \quad \text{Formula (2)}$$

Such summation readout is the same as linear compensation, and thus the spatial logical position of the read-out pixel (the summed pixel) can be thought of as being in the center of a line connecting the central positions of the adjacent same-color pixels used in the summation. In this manner, the logical positions of pixels move due to summation readout, and thus an interval between the adjacent pixels $R_i'$ and $G1_i'$ is no longer the same as an interval between the pixels $G1_i'$ and $R_i+1'$. In the case where the same summation readout is also carried out in the vertical direction, for example, the positions of the pixels before and after the summation will be as indicated in FIG. 2B. Such center deviation is a cause of jaggies, and thus it is necessary to correct the positions of the summed pixels so as to be at equal intervals. Specific processing for such positional correction will be described later.

Next, the image processing unit 104 according to the present embodiment will be described with reference to FIG. 3, which is a block diagram illustrating an example of the functional configuration of the image processing unit 104, and FIG. 4, which is a flowchart illustrating operations performed by the image processing unit 104. The image signal from the A/D conversion unit 103 is input into the image processing unit 104. Here, it is assumed that the input image signal has undergone the summation readout shown in FIG. 2B and the pixel positions are not at equal intervals as a result.

First, in S401, the image processing unit 104 applies, to the respective pixel signals contained in the input image signal, white balance gain based on the colors of the pixels (here, G1 and G2 are considered to be different colors), using a white balance correction unit 301. In the present embodiment, the image sensor 102 has a primary color Bayer array-type pixel array, and thus the white balance correction unit 301 applies white balance gain independently to the summed pixels R', G1', G2', and B' as indicated by the following Formulas (3) to (6).

$$R' = WBr \times R' \quad \text{Formula (3)}$$

$$G1' = WBg1 \times G1' \quad \text{Formula (4)}$$

$$G2' = WBg2 \times G2' \quad \text{Formula (5)}$$

$$B' = WBb \times B' \quad \text{Formula (6)}$$

White balance gains WBr, WBg1, WBg2, and WBb may be computed using the technique disclosed in Japanese Patent No. 3513506, for example. Specifically, the image is divided into a plurality of regions, and it is determined whether the image data in each of the obtained regions is white based on conditions for the positions of the respective regions. The gain used during the white balance correction is then computed based on the image data in regions determined to be white. However, the white balance gain may be computed using another known technique instead. A Bayer array image signal output from the white balance correction unit 301 is input into a first position correction unit 302 and a second position correction unit 303.

Next, a pixel position correction process carried out in S402 will be described using FIGS. 5A to 6C. Note that to simplify the descriptions, the positions of the respective pixels are assumed to correspond to the spatial logical positions. Accordingly, the positions of the respective pixels in the memory do not necessarily match the spatial logical positions, and all of the pixel values in the memory may be recorded without providing any gaps therebetween.

It is furthermore assumed in the present embodiment that a position correction unit includes one each of the first position correction unit 302 and the second position correction unit 303. As shown in FIG. 5A, the first position correction unit 302 obtains a weighted sum of the value of a summed pixel whose position is to be corrected (a pixel of interest), and the value of a summed pixel that has the same color as the pixel of interest and is adjacent to the pixel of interest in a predetermined direction in which the position is to be corrected (the horizontal direction, here). Then, by replacing the value of the pixel of interest with the value found by obtaining the weighted sum, the first position correction unit 302 corrects the position of the pixel of interest in the horizontal direction to a predetermined horizontal position (a target position) determined so that the pixels are positioned at equal intervals. More specifically, the value of the pixel of interest is replaced with a value found by obtaining a weighted sum of the value of the pixel of interest and a value of a summed pixel that has the same color as the pixel of interest and that is adjacent to the pixel of interest in the horizontal direction with the post-correction target position located therebetween. When correcting positions in the horizontal direction, the first position correction unit 302 uses Formulas (7) and (8) for the R pixels and the G1 pixels.

$$R_i'' = (R_{(i-1)}' + 7 \times R_i')/8 \qquad \text{Formula (7)}$$

$$G1_i'' = (7 \times G1_i' + G1_{(i+1)}')/8 \qquad \text{Formula (8)}$$

By obtaining a weighted sum in this manner, the positions of the summed pixels in the horizontal direction can be set at equal intervals. Note that the weighting on the summed pixels can be determined from, for example, a relationship between the positions of the summed pixels used in the correction and the post-correction target position of the pixel of interest. Specifically, if a ratio between a distance from one of the summed pixels to the post-correction target position of the pixel of interest and a distance from the other summed pixel to the post-correction target position of the pixel of interest is 1:7, a weighting ratio for the respective summed pixels may be set to the inverse of the distance ratio, namely 7:1.

On the other hand, as shown in FIG. 5B, the second position correction unit 303 obtains a weighted sum of the value of the pixel of interest and the value of a summed pixel (of any color) that is adjacent to the pixel of interest in the predetermined direction in which the position is to be corrected (the horizontal direction, here). Then, by replacing the value of the pixel of interest with the value found by obtaining the weighted sum, the second position correction unit 303 corrects the position of the pixel of interest in the horizontal direction to a predetermined horizontal position (a target position) determined so that the pixels are positioned at equal intervals. More specifically, the value of the pixel of interest is replaced with a value found by obtaining a weighted sum of the value of the pixel of interest and a value of a summed pixel having any color and that is adjacent to the pixel of interest in the horizontal direction with the post-correction target position located therebetween. When correcting positions in the horizontal direction, the positions of the R pixels and the G1 pixels are corrected using Formulas (9) and (10).

$$R_i'' = (G1_{(i-1)}' + 5 \times R_i')/6 \qquad \text{Formula (9)}$$

$$G1_i'' = (5 \times G1_i' + R_{(i+1)}')/6 \qquad \text{Formula (10)}$$

By obtaining a weighted sum in this manner, the positions of the summed pixels can be set at equal intervals. Note that the weighting on the summed pixel can be determined from, for example, a relationship between the position of the pixel used in the correction and the position to which the center is to be corrected (that is, the target position).

Note that the positions of each of the summed pixels are corrected so that the positions obtained through the correction performed by the first position correction unit 302 and the positions obtained through the correction performed by the second position correction unit 303 are the same.

The first position correction unit 302 and the second position correction unit 303 perform the same center correction processing in the pixel lines in which the G2 and B pixels are present. The pixel position correction is also carried out in the vertical direction, in the same manner as in the horizontal direction.

In a mosaic-shaped color filter provided in a typical image sensor, the intervals between different-color pixels are shorter than the intervals between same-color pixels, and thus the adjacent pixels used when the second position correction unit 303 obtains a weighted sum are closer to the target position than the same-color adjacent pixels used when the first position correction unit 302 obtains a weighted sum. The closer a subject is to an achromatic color, the less difference there will be between color component values, and thus the benefit of an improvement of the accuracy of the post-position correction pixel values found by obtaining a weighted sum, resulting from using the values of pixels in positions near the target position, will outweigh the benefit of using values of same-color pixels.

Figure 6B:
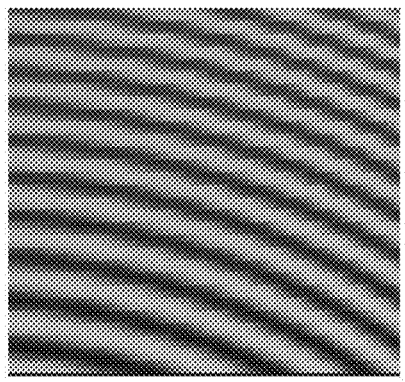
Figure 6C:
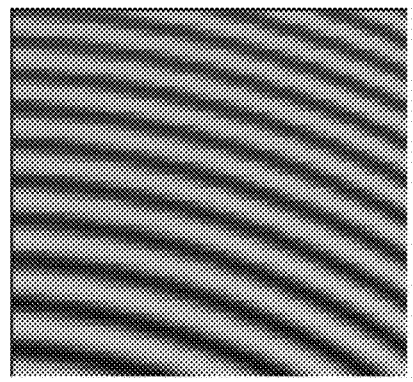

FIGS. 6A to 6C illustrate a comparison between a result of the pixel position correction performed by the first position correction unit 302 and a result of the pixel position correction performed by the second position correction unit 303 using a circular zone plate (CZP) image. FIGS. 6B and 6C illustrate images obtained by carrying out processes aside from the pixel position correction, such as noise reduction processing and the like, on the image shown in FIG. 6A under the same conditions, and then developing the image. Comparing FIGS. 6B and 6C, it can be seen that FIG. 6C shows improvement with respect to jaggies and less degradation in the resolution. This is thought to be because the CZP image is an achromatic color subject.

Returning to FIG. 3, the output of the first position correction unit 302 is input into a false color reduction unit 304 and an image combining unit 306. Meanwhile, the output of the second position correction unit 303 is input into the image combining unit 306.

Figure 7:
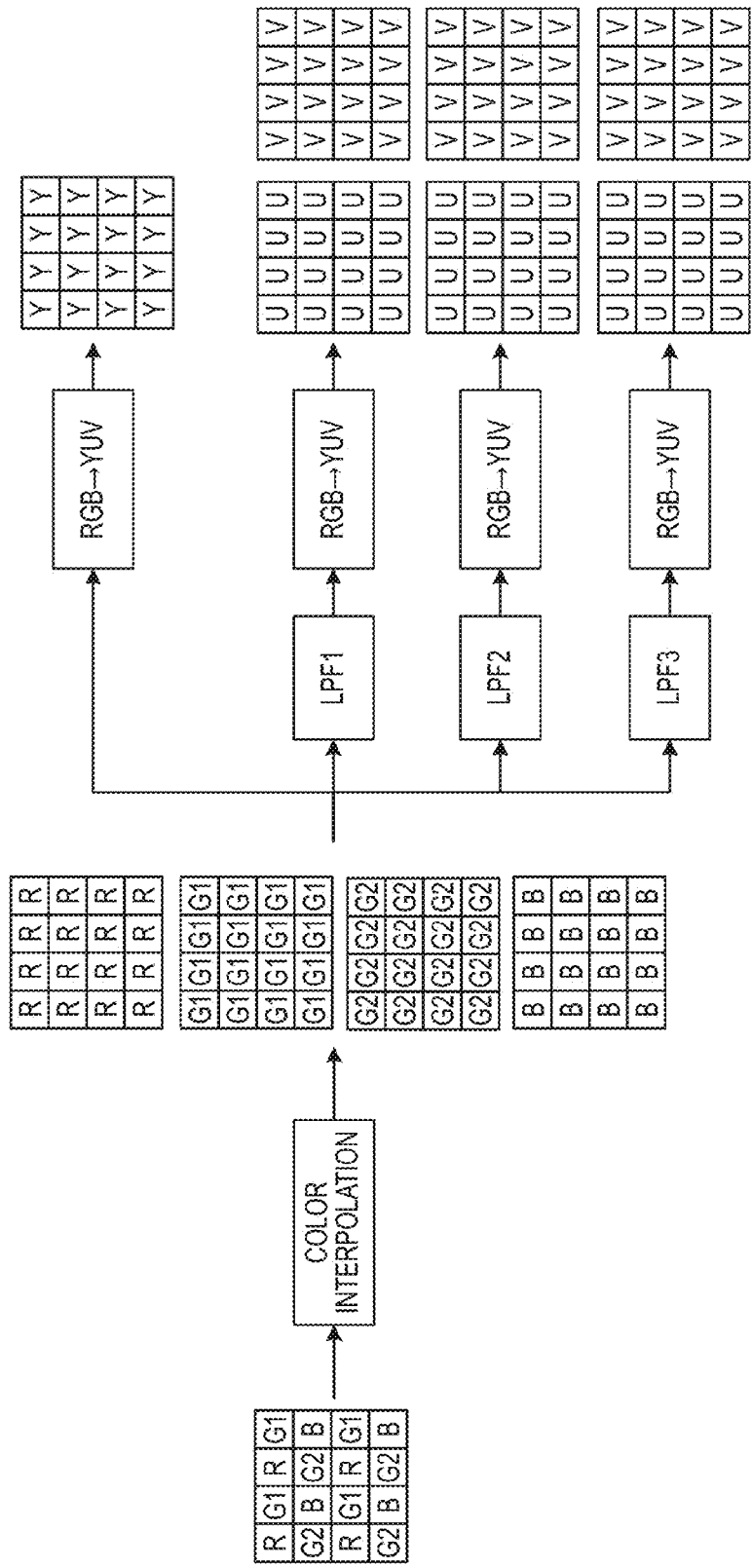
FIG. 7 is a diagram schematically illustrating a process for generating a YUV-format image signal from a Bayer array image signal.

Returning to FIG. 4, in S403, the image processing unit 104 carries out a false color reduction process on the Bayer array image signal output from the first position correction unit 302, using the false color reduction unit 304. Here, a known false color reduction process can be used. For example, as shown in FIG. 7, image signals in four planes, namely R, G1, G2, and B, are created by carrying out an interpolation process on the Bayer array image signal. Then, a filtering process is carried out using a plurality of low-pass filters (LPF1 to LPF3) having different band limit frequencies, and color difference signals (U, V), which serve as color components, are computed from the respective band-limited image signals. A high-frequency region is then determined from at least one of the slopes of image signals corresponding to the G1 signal and the G2 signal or a difference between the G1 signal and the G2 signal, and a color difference signal, generated from an image signal having a lower cutoff frequency the higher the frequency of the region is, is selected. On the other hand, a luminance signal (Y) is generated from an image signal not subjected to band limitation. Note that the false color reduction process is not limited to this method, and another known technique may be used instead.

The false color reduction unit 304 outputs the post-false color reduction color difference signals U and V to a color information computation unit 305 and a noise reduction unit 307, and outputs the luminance signal Y to the color information computation unit 305. Note that the conversion from RGB format to YUV format can be carried out using the following Formulas (11) to (13), for example. Note that in Formulas (11) to (13), the G signal can be computed by averaging the G1 signal and the G2 signal, obtaining a weighted sum of the G1 signal and the G2 signal, or the like, for example.

$$Y=0.299 \times R+0.587 \times G+0.114 \times B \quad \text{Formula (11)}$$

$$U=0.169 \times R-0.331 \times G+0.500 \times B \quad \text{Formula (12)}$$

$$V=0.500 \times R-0.419 \times G+0.081 \times B \quad \text{Formula (13)}$$

Next, in S404, the image processing unit 104 uses the color information computation unit 305 to compute a saturation S for each pixel, based on the luminance signal Y and the post-false color reduction processing color difference signals U and V. The saturation S may be computed by, for example, converting the luminance signal Y and the color difference signals U and V into R, G, and B values, and then using Formulas (14) to (16).

$$\text{MAX}=\max(R,G,B) \quad \text{Formula (14)}$$

$$\text{MIN}=\min(R,G,B) \quad \text{Formula (15)}$$

$$S=(\text{MAX}-\text{MIN})/\text{MAX} \quad \text{Formula (16)}$$

Note that the function max ( ) outputs a maximum value of the argument and the function min ( ) outputs a minimum value of the argument.

Although the present embodiment describes the color information of the pixels as a saturation, another index indicating the strength of the color, such as a color difference signal or the like, may be used. For example, the determination may be made using the sum of the square of the color difference signal U and the square of the color difference signal V. The saturation S is input into the image combining unit 306 and the noise reduction unit 307.

Figure 8:
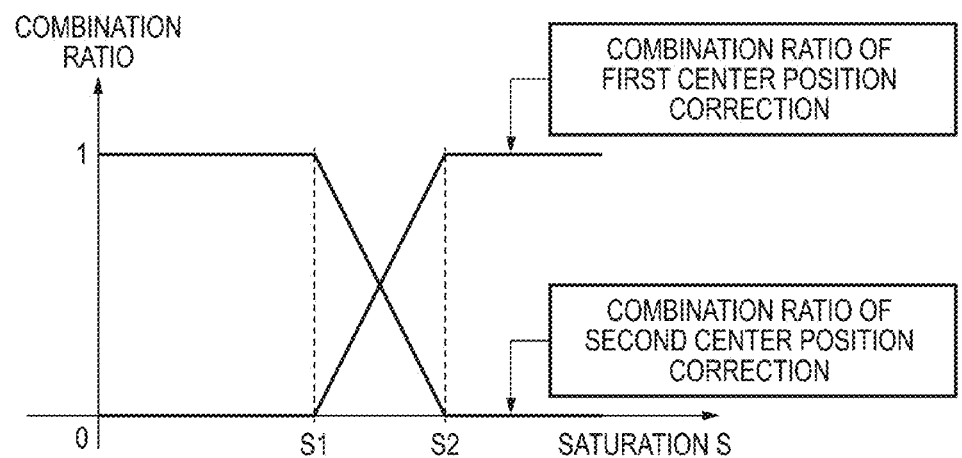
FIG. 8 is a diagram illustrating a relationship between saturation and a combination ratio used by an image combination unit 306 shown in FIG. 3.

Next, operations performed by the image combining unit 306 in S405 will be described using FIG. 8. The image combining unit 306 obtains a weighted sum of the output image signals from the first position correction unit 302 and the second position correction unit 303 based on the saturation S computed by the color information computation unit 305 for each pixel. FIG. 8 illustrates a relationship between the weights (combination ratios) when obtaining a weighted sum, based on the saturation S. The total of the weight is 1. Because a lower saturation S corresponds to the subject having a more achromatic color, the output of the second position correction unit 303, which is more effective for ameliorating jaggies, is weighted more (that is, the ratio is increased). Conversely, the higher the saturation S is, the more the output of the first position correction unit 302 is weighted (that is, the more the ratio is increased).

Specifically, a combination ratio P1 of the output of the first position correction unit 302 and a combination ratio P2 of the output of the second position correction unit 303 (where P1+P2=1) may be computed as indicated by Formulas (17) to (20).

$$P1=0, P2=1 \text{ if } (S<S1) \quad \text{Formula (17)}$$

$$P1=(S-S1)/(S2-S1) \text{ if } (S1 \leq S \leq S2) \quad \text{Formula (18)}$$

$$P2=(S2-S)/(S2-S1) \text{ if } (S1 \leq S \leq S2) \quad \text{Formula (19)}$$

$$P1=1, P2=0 \text{ if } (S>S2) \quad \text{Formula (20)}$$

Note that the thresholds S1 and S2, at which the combination ratios reach 1, can be determined experimentally, for example. Alternatively, a saturation at which the differences between the signal levels corresponding to R, B, and G, respectively, fall within a predetermined range can be calculated and set as the thresholds based on the spectral properties of the color filters corresponding to R, B, and G in the image sensor.

The image combining unit 306 generates a luminance component of the pixel of interest from the Bayer array image signals combined by obtaining a weighted sum in this manner. Specifically, after R, G, and B components have been found for each pixel through the interpolation process carried out on the Bayer array image signals, the luminance signal Y may be computed using Formula (11). The image combining unit 306 then outputs the luminance signal Y to the noise reduction unit 307.

Figure 9:
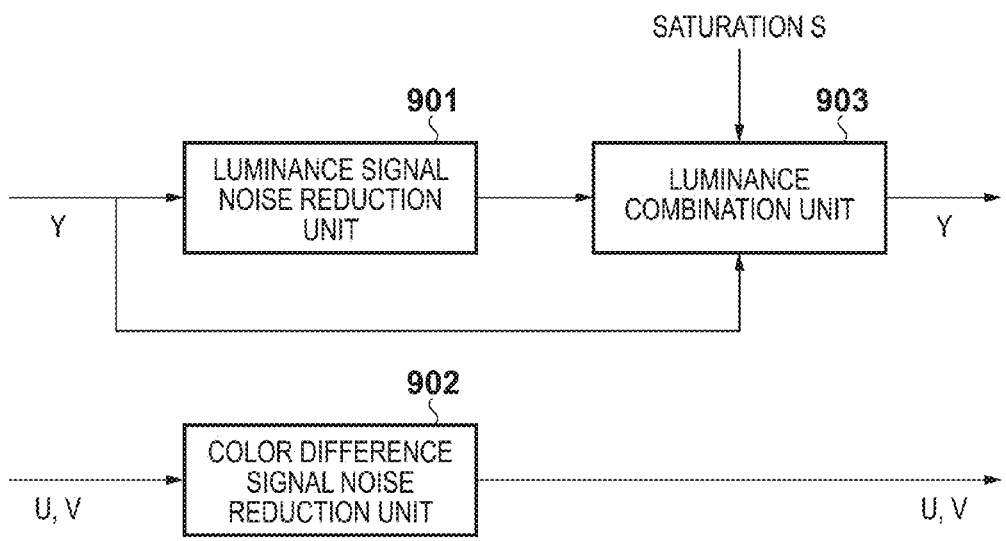
FIG. 9 is a block diagram illustrating an example of the configuration of a noise reduction unit 307 shown in FIG. 3.
Figure 10:
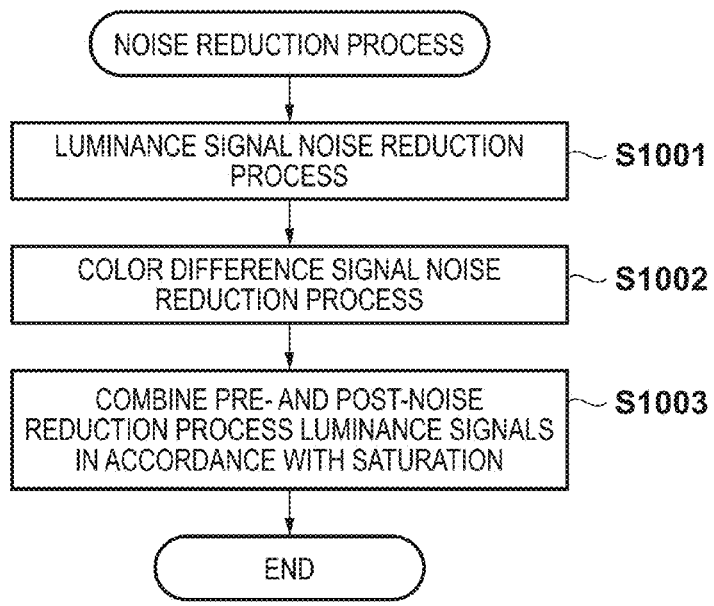
FIG. 10 is a flowchart illustrating operations performed by the noise reduction unit 307 shown in FIG. 3.

Finally, in S406, the image processing unit 104 applies noise reduction processing to the Y, U, and V signals using the noise reduction unit 307. FIG. 9 illustrates an example of the functional configuration of the noise reduction unit 307 according to the present embodiment, whereas FIG. 10 is a flowchart illustrating operations performed by the noise reduction unit 307.

In S1001 and S1002, the noise reduction unit 307 applies noise reduction processing to the luminance signal Y using a luminance signal noise reduction unit 901 and to the color difference signals U and V using a color difference signal noise reduction unit 902. Note that S1001 and S1002 may be carried out in parallel, the order thereof may be reversed, and so on.

The method for the noise reduction processing carried out on the luminance signal and the color difference signals is not particularly limited, and a known method can be used. For example, a filter process that increases the weight of a peripheral pixel in a direction having a high degree of resemblance to a pixel of interest, such as that disclosed in Japanese Patent No. 4626007, for example, can be used.

In S1003, a luminance combination unit 903 carries out a process for combining the pre- and post-noise reduction process luminance signals in accordance with the saturation S.

Here, a reason for combining the pre- and post-noise reduction process luminance signals in accordance with the saturation S will be explained. Based on the spectral properties of the R, G, and B filters in a primary color filter provided in a typical color image sensor, the white balance gain applied to the R component and the B component is greater than the white balance gain applied to the G component. As such, even in the case where there is no difference in noise levels between the color components prior to the white balance correction, the G component has a higher noise level than the R component and the B component after the white balance correction. Furthermore, the higher the combination ratio of the output from the second position correction unit, the more R or B signal will be contained in the post-pixel position correction G signal.

As indicated by Formula (11), the luminance signal Y contains more of the G signal, and thus the noise level is higher in luminance signals from pixels determined to have lower saturations (that is, pixels having a high combination ratio of the output from the second position correction unit). Accordingly, in the present embodiment, a coefficient for obtaining the weighted sum of the pre- and post-noise reduction process luminance signals Y is changed in accordance with the saturation in order to alleviate variations in the noise level from pixel to pixel.

Figure 11:
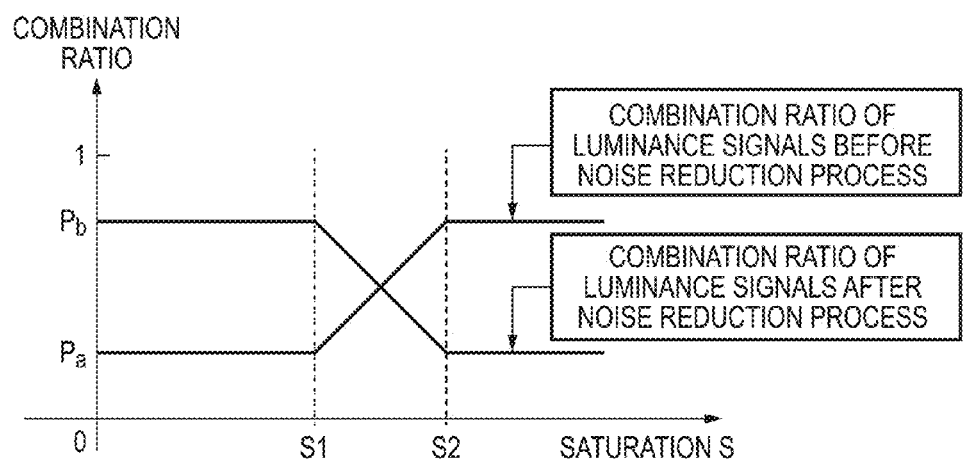
FIG. 11 is a diagram illustrating a relationship between saturation and a combination ratio used by the noise reduction unit 307 shown in FIG. 3.

Specifically, the post-noise reduction process luminance signal is weighted more for subjects having more achromatic color, for which a higher noise level is often thought to be present in the luminance signal Y. FIG. 11 illustrates an example of a relationship between the saturation S and the weights (combination ratios) of the pre- and post-noise reduction process luminance signals in the luminance combination unit 903. Specifically, the weight (combination ratio) P1 of the pre-noise reduction process luminance signal and the combination ratio P2 of the post-noise reduction process luminance signal may be determined as indicated by Formulas (21) to (25).

$$Pa+Pb=1 \quad \text{Formula (21)}$$

$$P1=Pa, P2=Pb \text{ if } (S<S1) \quad \text{Formula (22)}$$

$$P1=\{(S2-S)Pa+(S-S1)Pb\}/(S2-S1) \text{ if } (S1 \leq S \leq S2) \quad \text{Formula (23)}$$

$$P2=\{(S-S1)Pa+(S2-S)Pb\}/(S2-S1) \text{ if } (S1 \leq S \leq S2) \quad \text{Formula (24)}$$

$$P1=Pb, P2=Pa \text{ if } (S>S2) \quad \text{Formula (25)}$$

Note that a minimum value Pa and a maximum value Pb of the weight, and the thresholds S1 and S2 at which one of the combination ratios is maximum, can be determined experimentally, for example.

The luminance signal Y and the color difference signals U and V, which are the signals output from the image processing unit 104 (the noise reduction unit 307), are input to the recording unit 105, converted into a predetermined file format in accordance with the form for recording, such as a still image or a moving picture, and are recorded into the recording medium. The signals are also displayed in the display unit 108 through the control unit 106.

Variations

Although pixel position correction carried out on an image signal in which two adjacent pixels of the same color have been summed has been described thus far, the same position correction can be carried out on image signals read out through another method.

A pixel position correction process carried out on an image signal obtained through summation readout carried out within the image sensor in order to reduce the number of pixels in the horizontal direction to ¼ the total number of pixels in the image sensor, as indicated in FIG. 12A, will be described next as an example.

Although a horizontal line containing R pixels and G1 pixels in a primary color Bayer array is illustrated in FIG. 12A as an example, the same applies to a horizontal line containing G2 pixels and B pixels.

It is assumed here that summation readout has been carried out according to the following Formulas (26) and (27), for example. i indicates a pixel number, and is an integer of 1 or greater. Meanwhile, $R_i'$ indicates the value of a post-summation R pixel, and $G1_i'$ indicates the value of a post-summation G1 pixel.

$$R_i'=(R_{(4i-3)}+R_{(4i-2)}+R_{(4i-1)}+R_{4i})/4 \quad \text{Formula (26)}$$

$$G1_i'=(G1_{(4i-2)}+G1_{(4i-1)}+G1_{4i}+G1_{(4i+1)})/4 \quad \text{Formula (27)}$$

As with the summation readout indicated by Formulas (1) and (2), the intervals between the read-out adjacent pixels $R_i'$ and $G1_i'$ and between $G1_i'$ and $R_{(i+1)}'$ are not equal in this case.

When correcting the positions of the R pixel and the G1 pixel in the horizontal direction in this manner, the first position correction unit 302 may use the following Formulas (28) and (29).

$$R_i'=(R_{i-1}+15 \times R_i)/16 \quad \text{Formula (28)}$$

$$G1_i'=(15 \times G1_i+G1_{(i+1)})/16 \quad \text{Formula (29)}$$

Meanwhile, the positions of the pixels in the horizontal direction may be corrected by the second position correction unit 303 using the following Formulas (30) and (31).

$$R_i'=(G1_{(i-1)}+9 \times R_i)/10 \quad \text{Formula (30)}$$

$$G1_i'=(9 \times G1_i+R_{(i+1)})/10 \quad \text{Formula (31)}$$

By obtaining weighted sums in this manner, the positions of the summed pixels in the horizontal direction are set to equal intervals. Note that the weighting on the summed pixel can be determined from, for example, a relationship between the position of the summed pixel used in the correction and the position to which the center is to be corrected (that is, the target position).

Note that the positions of each of the summed pixels are corrected so that the positions obtained through the correction performed by the first position correction unit 302 and the positions obtained through the correction performed by the second position correction unit 303 are the same.

The first position correction unit 302 and the second position correction unit 303 perform the same center correction processing in the pixel lines in which the G2 and B pixels are present. The pixel position correction is also carried out in the vertical direction, in the same manner as in the horizontal direction.

The other processes are the same as in the aforementioned summation readout of two pixels.

According to the present embodiment, when correcting the centers in an image signal in which the positions of adjacent pixels are not at equal intervals (that is, in which there is center deviation), a correction result using a pixel of interest and an adjacent pixel of the same color and a correction result using a pixel adjacent to the pixel of interest are combined at a ratio based on the color information of the pixel of interest. Specifically, for example, a greater ratio of the correction result that uses the pixel adjacent to the pixel of interest is used in the combination as the saturation of the pixel of interest drops. According to this configuration, jaggies can be ameliorated more efficiently than when correcting the positions using only pixels of the same color as the pixel of interest. Furthermore, the center correction result that employs a different-color adjacent pixel that is close to the pixel of interest, rather than the adjacent pixel of the same color, is used, which achieves a further effect of suppressing a drop in the resolution. These effects are greater as the saturation of the pixel of interest drops.

The present embodiment describes using an image obtained through summation readout from the image sensor as an image in which the spatial positions of the pixels are not at equal intervals (that is, in which there is center deviation). However, it should be noted that the pixel position correction can be carried out in the same manner on other types of images in which center deviation is present. Although not limited thereto, an image in which pixels are summed after readout, an image that has undergone thinning at uneven intervals, and so on can be given as examples of other types of images that have center deviation.

Furthermore, the false color reduction process carried out prior to computing the color information of the pixel of interest in the present embodiment is carried out in order to prevent false colors from affecting the determination of the combination ratio performed by the image combining unit 306 and increasing the combination ratio of the correction result from the first position correction unit 302 beyond what is necessary.

Furthermore, in the present embodiment, the false color reduction process is carried out on the signal output from the first position correction unit 302. This is because the image signal output from the image combining unit 306 may contain the signal output from the second position correction unit 303, or in other words, may contain information of different color components than those in the pixel of interest, making it difficult to achieve accurate false color reduction processing.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-236261, filed on Nov. 14, 2013, which is hereby incorporated by reference herein its entirety.

What is claimed is:

1. An image processing apparatus that generates second image data from first image data, the first image data consisting of signals corresponding to a plurality of color components, the apparatus comprising:
    a first correction unit that generates a first signal of a pixel of interest in the second image data by adding a plurality of signals in the first image data that correspond to the same color component;
    a second correction unit that generates a second signal of the pixel of interest in the second image data by adding a plurality of signals in the first image data that correspond to different color components; and
    a mixing unit that mixes the first signal generated by the first correction unit and the second signal generated by the second correction unit based on color information of the pixel of interest.

2. The image processing apparatus according to claim 1, wherein a distance between pixels in the first image data corresponding to the plurality of signals added by the second correction unit is shorter than a distance between pixels in the first image data corresponding to the plurality of signals added by the first correction unit.

3. The image processing apparatus according to claim 1, wherein the first correction unit generates the first signal by obtaining a weighted sum of a signal of the pixel of interest and a signal of a pixel, in the first image data, that has the same color as the pixel of interest and that is present in a predetermined direction from the pixel of interest; and
    the second correction unit generates the second signal by obtaining a weighted sum of the signal of the pixel of interest and a signal of a pixel that is closer to the pixel of interest in the predetermined direction than the pixel that has the same color.

4. The image processing apparatus according to claim 1, wherein the mixing unit carries out the mixing with a higher ratio of the second signal the closer the pixel of interest is to an achromatic color according to the color information.

5. The image processing apparatus according to claim 1, wherein the first correction unit generates the first signal using the signal of a pixel, in the first image data, that has the same color as the pixel of interest and that is adjacent to the pixel of interest in the predetermined direction.

6. The image processing apparatus according to claim 1, wherein the second correction unit generates the second signal using the signal of a pixel, in the first image data, that is adjacent to the pixel of interest in the predetermined direction.

7. The image processing apparatus according to claim 1, wherein the first image data is data of an image, from a color image sensor, that has undergone summation readout or thinning readout.

8. The image processing apparatus according to claim 1, wherein the first image data is data of an image obtained by adding or thinning pixels in an image read out from a color image sensor.

9. The image processing apparatus according to claim 1, wherein the color information is a saturation or a color difference.

10. A non-transitory computer-readable storage medium in which is recorded a program for causing a computer to function as the respective units of the image processing apparatus according to claim 1.

11. The image processing apparatus according to claim 1, further comprising:
    a computation unit that computes the color information from the value of the first signal generated by the first correction unit.

12. The image processing apparatus according to claim 11, further comprising:
    a false color reduction unit that applies a false color reduction process to the value of the first signal generated by the first correction unit,
    wherein the computation unit computes the color information from the value of the pixel of interest to which the false color reduction process has been applied.

13. The image processing apparatus according to claim 1, wherein the mixing unit generates a value of a luminance component of the pixel of interest, and the value of the first signal is used for the value of a color component of the pixel of interest.

14. The image processing apparatus according to claim 13, further comprising:
- a noise reduction unit that applies a noise reduction process to the value of the luminance component and obtains a weighted sum of the pre- and post-noise reduction process values in accordance with the color information,
- wherein the noise reduction unit obtains the weighted sum with a higher ratio of the post-noise reduction process signal the closer the pixel of interest is to an achromatic color according to the color information.

15. A control method for an image processing apparatus that generates second image data from first image data, the first data consisting of signals corresponding to a plurality of color components, the method comprising:
- a first correction step of generating a first signal of a pixel of interest in the second image data by adding a plurality of signals in the first image data that correspond to the same color component;
- a second correction step of generating a second signal of the pixel of interest in the second image data by adding a plurality of signals in the first image data that correspond to different color components;
- a mixing step of mixing the first signal generated in the first correction step and the second signal generated in the second correction step based on color information of the pixel of interest.

* * * * *